United States Patent [19]

Ogata et al.

[11] 3,960,638

[45] June 1, 1976

[54] PROCESS FOR SEPARATING A NUMBER OF SHEETS INTO GROUPS

[75] Inventors: Yasuhiro Ogata; Takao Hayashi, both of Fujimiya, Japan

[73] Assignee: Fuji Photo Film Co., Ltd., Minami-ashigara, Japan

[22] Filed: Dec. 11, 1974

[21] Appl. No.: 531,497

[30] Foreign Application Priority Data

Dec. 28, 1973  Japan.................................... 49-506

[52] U.S. Cl................................. 156/305; 156/328; 282/DIG. 2; 282/22 R; 282/24 R; 428/194; 260/67 A
[51] Int. Cl.² ........................................... B41L 1/24
[58] Field of Search ..................... 260/67 A, 505 C; 282/DIG. 2, 24, 22, 26; 156/305, 290, 291, 297; 428/194; 427/285

[56] References Cited

UNITED STATES PATENTS

| | | | |
|---|---|---|---|
| 3,216,926 | 11/1965 | Kurtz et al. | 260/67 A |
| 3,393,925 | 7/1968 | Calvert | 428/194 X |

FOREIGN PATENTS OR APPLICATIONS 2,254,483  6/1973  Germany

Primary Examiner—Ralph S. Kendall
Attorney, Agent, or Firm—Sughrue, Rothwell, Mion, Zinn & Macpeak

[57] ABSTRACT

A process for separating a number of sheets into groups of sheets comprising coating an adhesive composition on an edge of a stack of the sheets and fanning the sheets. The adhesive composition contains a naphthalene sulfonic acid formaldehyde condensation product, a water-soluble polymer material, and a water-soluble metal salt.

11 Claims, No Drawings

PROCESS FOR SEPARATING A NUMBER OF SHEETS INTO GROUPS

BACKGROUND OF THE INVENTION

1. Field of the Invention

The present invention relates to a process for separating a number of sheets into groups, and an adhesive composition for use therein.

2. Description of the Prior Art

Processes for separating a number of sheets such as a pressure sensitive copying paper into groups are described in U.S. Pat. Nos. 2,711,375; 2,712,507; 2,730,456; 2,730,457; 3,418,250; 3,432,327; etc., for example, and adhesive compositions for use therein are described in detail in Japanese Patent Publication No. 35696/1971, Japanese Patent Publication Nos. 40464/1973 and 7634/1975, etc.

In the prior art methods, gelatin, gelatin derivatives, gelatin decomposition products, or mixtures thereof with aqueous emulsions of a resin, i.e., a polymer latex, are used as an adhesive component.

However, since gelatins tend to degrade, and the viscosity thereof varies greatly depending upon the temperature, adhesive containing gelatins are not satisfactory in storage stability, adhesiveness, and separability. In the present specification, the term "separability" designates that the sheets are separated into groups. Thus, when the separability is good, the sheets are easily separated into groups, and when the separability is poor the sheets are difficult to separate into groups. The latexes which are added for the purpose of improving the adhesiveness, decrease the separability, and thus it is desired that the adhesives containing the latexes are further improved.

SUMMARY OF THE INVENTION

An object of the present invention is to provide a process for separating simply and correctly a number of sheets into groups.

Another object of the present invention is to provide an adhesive composition which has excellent storage stability, adhesiveness, separability, and drying rate, and which is used in separating a number of sheets into groups.

These and other objects and advantages of the present invention will be apparent from the following description.

These objects of the invention are attained by using an adhesive composition containing a naphthalene sulfonic acid-formaldehyde condensation product, a water-soluble polymer material, and a water-soluble metal salt.

DETAILED DESCRIPTION OF THE INVENTION

By the process for separating sheets into groups of the present invention is meant that when the cut edge of a stack of a number of sheets, i.e., an edge of a stack of sheets, is coated with an adhesive and fanned or stroked, the sheets of each group are selectively adhered. The process will be explained by reference to the case where the sheets are pressure sensitive copying papers. In this case, the pressure sensitive copying papers are the combination of a sheet produced by coating a microcapsule layer containing a color former on a support (hereinafter referred to as an "A Sheet"), a sheet produced by coating a developing agent layer and the foregoing microcapsule layer on the surface and the back of a support, respectively (hereinafter referred to as a "B Sheet"), and a sheet produced by coating a developing agent layer on a support (hereinafter referred to as a "C Sheet"), or the combination of an A Sheet and a C Sheet.

These pressure sensitive copying papers are assembled in the sequence of, for example, A-C, A-C, A-C, . . ., or A-B-B . . . -B-C, A-B-B . . . -B-C, A-B-B . . . -B-C-, . . . , and they are cut to thereby produce, for example, a sheaf of slips. When an adhesive composition is coated on the cutting plane, or the edge of the stack, and dried, each A-C or A-B-B . . . -B-C set is selectively adhered and no adhesion occurs between C and A. The adhesion strength of A-C or A-B-B . . . -B-C must be at least sufficient such that these sheets are not peeled apart with simple handling. It is most preferred that no adhesion between C and A occurs at all, i.e., a good separability. Thus, by applying an adhesive composition to pressure sensitive copying papers, the pressure sensitive copying papers are easily separated into groups comprising a certain number of papers which are required for copying.

The naphthalene sulfonic acid-formaldehyde condensation products of the present invention are preferably represented by the following general formula:

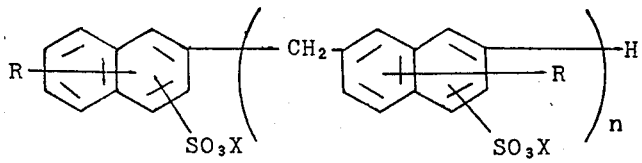

wherein R, which may be the same or different, (a plurality of R groups can be contained in the naphthalene nuclei), is a hydrogen atom or an alkyl group; X is a hydrogen atom, an alkali metal atom, or an ammonium group; and $n$ is an integer.

Those condensation products in which the alkyl group contains 1 to 18 carbon atoms, X is a sodium or potassium atom, or an ammonia group, and $n$ is 1 to 13, are conveniently used and are thus preferred in the present invention. Particularly, those condensation products in which R is a hydrogen atom or an alkyl group containing 1 to 4, particularly 1 to 3 carbon atoms, X is a sodium or potassium atom, and $n$ is 1 to 5, particularly 2 to 5, are preferred. Suitable examples of alkyl groups having 1 to 18 carbom atoms are methyl, ethyl, propyl, isopropyl, n-butyl, hexyl, octyl, undecyl, hexadecyl, etc. Preferable examples of these alkyl groups are methyl, ethyl, propyl, isopropyl and n-butyl and hydrogen is particularly preferred as R. Various compounds represented by the above general formula are known as anionic surface active agents and are readily available.

The degree of polymerization and the substituents of the naphthalene sulfonic acid-formaldehyde condensation product of the present invention sometimes influence the effect of the present invention. Hence, mixtures of condensation products having different degrees of polymerization and/or different substituents are sometimes useful.

The water-soluble polymer material is a polymer material which is soluble in water and capable of forming a film when dried. A suitable molecular weight ranges from about 100 to about 500,000, preferably 300 to 100,000. Representative examples of these water-soluble polymer materials are natural polymers, e.g., gelatin, casein, albumin, shellac, starch, dextrin, agar agar, alginic acid salts, gum arabic, pectin, tragacanth gum, gluten and the like; semi-synthetic polymers, e.g., carboxymethyl cellulose, methyl cellulose, ethyl cellulose, hydroxyethyl cellulose, maleated starch, phosphoric acid starch, cyanoethyl carboxymethyl starch, hydroxyethyl starch, dialdehyde starch, oxidized starch, and the like; synthetic polymers, e.g., polyvinyl alcohol, polyacrylamide, polyvinyl pyrrolidone, polyethylene oxide, polyvinyl methyl ether, acrylic acid-acrylamide copolymers, styrene-methacrylic acid copolymers, vinyl acetate-acrylic acid copolymers, dimethyl itaconate-acrylic acid copolymers, acrylonitrile-acrylic acid copolymers, acrylonitrile-acrylamide-acrylic acid copolymers, acrylamidestyrene-acrylic acid copolymers, and the like; etc.

The water-soluble metal salts as used in the present invention include those salts having a solubility in water at 25°C of at least 0.1% by weight, preferably 0.2% by weight or more, e.g., ammonium salts and salts of univalent metal ions such as $K^+$, and $Na^+$; salts of divalent metal ions such as $Mg^{2+}$, $Ca^{2+}$, $Zn^{2+}$, and $Sn^{2+}$; and salts of trivalent metal ions such as $Al^{3+}$ and $Fe^{3+}$. Anions forming water-soluble salts together with the above-described metal ions are $Cl^-$, $Br^-$, $NO_1^-$, $NO_3^-$, $SO_4^{2-}$, $S_2O_3^{2-}$, $HSO_4^-$, $SO_3^{2-}$, $B_{10}O_{16}^{2-}$, $HCO_3^-$, $CO_3^{2-}$, $PO_4^{3-}$, $H_5(PO_4)_2^-$, $H_2PO_3^-$, $H_2PO_4^-$, $HPO_3^{2-}$, $HPO_4^{2-}$, $PO_3^{3-}$, and the like. Specific examples of suitable water-soluble salts of these metal ions and anions are, for example, $K_2B_{10}O_{16}$, $KBr$, $K_2CO_3$, $KCl$, $KHCO_3$, $KH_5(PO_4)_2$, $KHSO_4$, $KI$, $KNO_3$, $K_3PO_4$, $K_2SO_3$, $K_2SO_4$, $K_2S_2O_3$, $NaAl(SO_4)_2$, $NaBr$, $Na_2CO_3$, $NaCl$, $NaHCO_3$, $NaH_2PO_3$, $Na_2HPO_3$, $Na_2HPO_4$, $NaH_2PO_4$, $NaNO_3$, $NaNO_2$, $Na_3PO_4$, $Na_2SO_4$, $Na_2SO_3$, $Na_2B_{10}O_{16}$, $NaHSO_4$, $NH_4Cl$, $NH_4HCO_3$, $NH_4H_2PO_3$, $NH_4H_2PO_4$, $NH_4NO_3$, $(NH_4)_2SO_4$, $MgBr_2$, $MgCO_3$, $MgCl_2$, $MgI_2$, $Mg(NO_2)_2$, $Mg(NO_3)_2$, $MgSO_3$, $MgSO_4$, $CaCL_2$, $CaBr_2$, $Ca(NO_2)_2$, $CaSO_4$, $CaS_2O_3$, $SnCl_2$, $SnSO_4$, $ZnBr_2$, $ZnCl_2$, $Zn(NO_3)_2$, $Zn_3(PO_4)_2$, $ZnSO_4$, $AlCl_3$, $Al(NO_3)_3$, $Al_2(SO_4)_3$, $FeCl_3$, $Fe(NO_3)_3$, $Fe_2(SO_4)_3$, and the like. Of these salts, salts of $K^+$, $Na^+$ or $Zn^{2+}$, i.e., $K_2SO_4$, $Na_2SO_4$, $ZnCl_2$, $ZnSO_4$, and the like are preferred, and $Na_2SO_4$ and $ZnCl_2$ are particularly preferred in the present invention.

Preferably, the composition of the present invention contains about 5 to 40% by weight, particularly 7 to 30% by weight, of the naphthalene sulfonic acid-formaldehyde condensation product, about 0.1 to 20% by weight, particularly 0.1 to 15% by weight, of the water-soluble polymer material, and about 0.1 to 6% by weight, particularly 0.5 to 4% by weight, of the water-soluble metal salt.

The addition of a polymer emulsion to the adhesive composition of the present invention brings about even more effective results.

The adhesive composition can contain, if desired a water-dispersible binder. In general, the use of a binder in an adhesive composition for separation of sheets into groups has been disadvantageous in that separability is lost and a long period of time is required in the adhesion although the adhesion strength is increased. To the contrary, in the present invention, the use of a binder enables a composition which has excellent separability and adhesiveness to be obtained, and thus the composition can be extended to a wider variety of applications.

Suitable water-dispersible binders include generally latexes and emulsions with water as a dispersion medium, such as a styrene-butadiene based latex, a butadiene-acrylonitrile based latex, a chloroprene based latex, a vinyl acetate based latex, an acryl based latex, a vinyl chloride based latex, or a like based latex as obtained by emulsion polymerization, and a polybutadiene emulsion, a polyisoprene emulsion, a butyl rubber emulsion, and the like which are produced by dispersing polymers produced by ion polymerization in water using a solvent and an emulsifier.

The polymer material latexes will be described in detail. The styrene-butadiene rubber latex comprises 25 to 75 parts by weight of styrene and 75 to 25 parts by weight of butadiene, preferably 40 to 65 parts by weight of styrene and 60 to 35 parts by weight of butadiene, and the latex can more preferably by carboxy-modified. The butadiene-acrylonitrile rubber latex comprises 75 to 60 parts by weight of butadiene and 25 to 40 parts by weight of acrylonitrile. For the vinyl acetate based latex, polyvinyl acetate, and copolymers of vinyl acetate and acrylic acid esters or methacrylic acid esters, e.g., methyl acrylate, ethyl acrylate, and methyl methacrylate, can be used, and particularly, a vinyl acetate-acrylic acid ester copolymer and a vinyl acetate-methacrylic acid ester copolymer are preferred. For the acryl based latex, a methacrylic acid ethyl ester-acrylic acid ethyl ester copolymer, a styrene-acrylic acid ester copolymer, a butadiene-acrylic acid ester copolymer, and the like can be used. Furthermore, a vinyl chloride based latex and a vinylidene chloride based latex, etc., can be used. Particularly useful polymer material latexes are a styrene-butadiene based latex and an acryl based latex, and carboxy modified latexes are particularly preferred. The polymer material emulsion which can be used in the present invention generally has a solid content of 10 to 70% by weight, a particle diameter of 0.1 to 5.0 $\mu$, and a viscosity of 0.5 to 1000 poises.

In the composition the water-dispersible binders are used for forming a film, and it is further preferred that they have adhesiveness as an adhesive and the ability to selectively permeate an adhesive between sheets. Where the adhesive composition contains a water-dispersible binder, the adhesive composition can contain about 10 to 300% by weight, preferably 50 to 200% by weight, of the binder based upon the weight of the above-described condensation product.

The adhesive composition of the present invention can contain, if desired, cationic, anionic, non-ionic or amphoteric surface active agents such as sodium dodecylbenzene sulfonate, trimethyloctadecyl ammonium chloride, sodium oleate, a polyoxyethylene alkylaryl ether, polyethylene glycol dodecylphenyl ether, sodium lignin sulfonate, sorbitan monooleate, an alkyl betaine, an alkyl imidazole, and the like. The surface active agent can be present in a proportion of 0.1 to 5% by weight based upon the weight of the above-described condensation product.

The microcapsules for use in pressure sensitive copying papers can be easily produced using well-known methods. Since the concentration of the color former can be easily determined on dissolving the color former in the solvent employed in the production of the microcapsules, the present invention is not restricted in terms of microcapsule production methods at all. Microcapsules can be produced according to, for example, the coacervation method as described in U.S. Pat. Nos. 2,800,457; 2,800,458; 3,041,289; 3,687,865; etc., the interfacial polymerization method as described in U.S. Pat. Nos. 3,492,380; 3,577,515, British Pat. Nos. 950,443; 1,046,409; 1,091,141, etc., internal polymerization method as described in British Pat. No. 1,237,498, French Pat. Nos. 2,060,818; 2,090,862; etc., external polymerization method as described in British Pat. No. 989,264, Japanese Patent Publication Nos. 12380/1962, 14327/1962, 29483/1970, 7313/1971, 30282/1971, etc., and the like.

Solvents for use in dissolving the color former in the present invention are not limited and thus any hitherto used solvent can be employed. Typical examples of suitable solvents are aromatic synthetic oils such as alkylated naphthalene, alkylated biphenyl, hydrogenated terphenyl, alkylated diphenyl methane, and the like (wherein the number of carbon atoms in the alkyl group is about 1 to 5, and the number of alkyl groups is 1 to 4), petroleum fractions such as kerosene, naphtha, paraffin, and the like, aliphatic synthetic oils such as chlorinated paraffin, and the like, vegetable oils such as cotton seed oil, soy bean oil, linseed oil, and the like, and mixtures thereof. The concentration of the color former solution is not particularly restricted, and thus microcapsules can be easily produced by one skilled in the art using a concentration of the color former solution (about 1 to 10%) as used in conventional pressure sensitive copying papers.

The color former of the present invention is a substantially colorless compound which forms a color when brought in contact with a solid acid and the color former can be defined as an electron accepting and substantially colorless organic compound. The type and characteristics of the color former do not materially influence the present invention because the composition of the adhesive is important in the present invention. Thus, any kind of color former can be used. For example, triarylmethane compounds, diarylmethane compounds, xanthene compounds, thiazine compounds, spiropyran compounds and the like can be used.

Representative examples of color formers are listed below.

Examples of triphenylmethane compounds are 3,3-bis(p-dimethylaminophenyl)-6-dimethylaminophthalide, i.e., Crystal Violet lactone, 3,3-bis(p-dimethylaminophenyl)phthalide, 3-(p-dimethylaminophenyl)-3-(1,2-dimethylindol-3-yl)phthalide, 3-(p-dimethylaminophenyl)-3-(2-methylindol-3-yl)phthalide, 3-(p-dimethylaminophenyl)-3-(2-phenylindol-3-yl)phthalide, 3,3-bis(1,2-dimethylindol-3-yl)-5-dimethylaminophthalide, 3,3-bis-(1,2-dimethylindol-3-yl)-6-dimethylaminophthalide, 3,3-bis-(9-ethylcarbazol-3-yl)-5-dimethylaminophthalide, 3,3-bis-(2-phenylindol-3-yl)-5-dimethylaminophthalide, 3-p-dimethylaminophenyl-3-(1-methylpyrrol-2-yl)-6-dimethylaminophthalide, and the like.

Examples of diphenylmethane compounds are 4,4'-bis-dimethylaminobenzhydrine benzyl ether, N-halophenyl leuco Auramine, N-2,4,5-trichlorophenyl leuco Auramine, and the like.

Examples of xanthene compounds are Rhodamine-B-anilinolactam, Rhodamine-(p-nitroanilino)lactam, Rhodamine-B-(p-chloroanilino)lactam, 7-dimethylamino-2-methoxyfluoran, 7-diethylamino-2-methoxyfluoran, 7-diethylamino-3-chloro-2-methylfluoran, 7-diethylamino-3-(acetylmethylamino)fluoran, 7-diethylamino-3-(dibenzylamino)fluoran, 7-diethylamino-3-(methylbenzylamino)fluoran, 7-diethylamino-3-(chloroethylmethylamino)fluoran, 7-diethylamino-3-(diethylamino)fluoran, and the like.

Examples of thiazine compounds are benzoyl leuco Methylene Blue, p-nitrobenzyl leuco Methylene Blue, and the like.

Examples of spiro compounds are 3-methyl-spirodinaphthopyran, 3-ethyl-spiro-dinaphthopyran, 3,3-dichlorospiro-dinaphthopyran, 3-benzyl-spiro-dinaphthopyran, 3-methylnaphtho-(3-methoxybenzo)-spiropyran, 3-propyl-spiro-dibenzodipyran, and the like.

These color formers can be used alone or as mixtures comprising two or more thereof.

Thus, a microcapsule coating liquid can be obtained. Preferably, the microcapsule is mono-nuclear, but the objects of the present invention can be attained with multi-nuclear capsules. The size of the microcapsules is generally about 1 to 500 $\mu$, and preferably about 2 to 50 $\mu$. In the present invention, capsules having about the same size can be used.

The microcapsule coating liquid can be coated on a support as it is since it is generally a capsule dispersion liquid. A binder such as a latex, e.g., a styrene-butadiene rubber latex, and the like, or a water-soluble polymeric compound, e.g., starch, carboxymethyl cellulose, polyvinyl alcohol, gum arabic, casein, gelatin, and the like can be added and coated, with or without a separation of the microcapsules from the capsule dispersion. Furthermore, a capsule reinforcing agent such as a fine powder of cellulose as described in U.S. Pat. No. 2,711,375, a fine powder of a polymer as described in U.S. Pat. No. 3,625,736, a fine powder of starch as described in British Patent No. 1,232,347, and microcapsules containing no color former as described in British Patent No. 1,235,991 can be added to the capsule coating liquid or a capsule layer. It is desirable that the capsule reinforcing agent is present scattered in the capsule layer or on the surface thereof rather than in a layer form.

A paper, a plastic film a resin coated paper, a synthetic paper, and the like can be used as the support. The microcapsule layer is coated on at least one side of the support, or on or under the developer layer as described hereinafter, or on the side of the support opposite the developer layer.

In the present specification, the developer designates a solid acid, and mmore specifically an electron accepting solid acid. Examples of developers are described in the above-described patents, and include, for example, clays, e.g., acid clay, activated clay, attapulgite, and the like, organic acids, e.g., aromatic carboxy compounds such as salicylic acid, aromatic hydroxy compounds such as p-t-butylphenol, p-t-amylphenol, o-chlorophenol, m-chlorophenol, p-chlorophenol, and the like, or metal salts thereof such as the zinc salt and the like, mixtures of an organic acid and a metal compound, e.g., zinc oxide, acid polymers, e.g., a phenol-formaldehyde resin, and a phenolacetylene resin, and the like. Suitable developers are described in U.S. Pat. Nos. 3,501,331; 3,669,711; 3,427,180; 3,455,721; 3,516,845, 3,634,121; 3,672,935; 3,722,120, 3,772,052; Japanese Patent Application Nos.

48545/1970, 49339/1970, 83651/1970, 84539/1970, 93245/1970, 93247/1970, 94874/1970, 109872/1970, 112038/1970, 112040/1970, 118978/1970, 118979/1970, 86950/1971, etc.

The developer can be coated on the support together with a binder. Suitable supports are described above. Latexes such as a styrene-butadiene rubber latex, a styrene-butadieneacrylonitrile latex, a styrene-maleic acid copolymer latex, and the like; water-soluble natural polymeric compounds such as proteins, e.g., gelatin, gum arabic, albumin, casein, etc., celluloses, e.g., carboxymethyl cellulose, hydroxyethyl cellulose, etc., saccharides, e.g., agar, sodium alginate, starch, carboxymethyl starch, etc., and the like; water-soluble synthetic polymeric compounds such as polyvinyl alcohol, polyvinyl pyrrolidone, polyacrylic acid, polyacrylamide, and the like; organic solvent-soluble polymeric compounds such as nitrocellulose, ethylcellulose, a polyester resin, polyvinyl acetate, polyvinylidene, chloride, a vinyl chloride-vinylidene chloride copolymer, and the like; etc., can be used as the binder. These binders can also be used as a binder for the capsule dispersion liquid. In addition, hitherto known additives can be added to the developer layer.

The naphthalene sulfonic acid-formaldehyde condensation product can be considered to be a quite excellent component in that it is not only free from the disadvantages of the gelatins, but it provides an adhesive with separability. However, the naphthalene sulfonic acid-formaldehyde condensation product alone is insufficient in the adhesive strength.

Where the naphthalene sulfonic acid-formaldehyde condensation product is used together with the water-soluble polymer material, the adhesion strength is increased as compared with the case where the naphthalene sulfonic acid-formaldehyde condensation product is used along. The thus increased adhesion strength is not sufficient in fields where higher adhesion strength is required. On the other hand, by using the naphthalene sulfonic acid-formaldehyde condensation product in combination with the water-soluble metal salt, the adhesion strength can be increased without deteriorating separability. However, the thus increased adhesion strength is not sufficient in fields where higher adhesion strength is required.

In accordance with the present invention, by using the mixture of the naphthalene sulfonic acid-formaldehyde condensation product, the water-soluble polymer material, and the water-soluble metal salt, it has been surprisingly found that an adhesive composition can be obtained which has a quite high adhesion strength and is quite excellent in separability. That is, the adhesive composition of the present invention is far superior to conventional adhesives, and the range of its use is broad.

The fact that a useful and advantageous effect can be obtained by the use of the adhesive composition of the present invention containing the naphthalene sulfonic acid-formaldehyde condensation product, the water-soluble polymer material, and the water-soluble metal salt will be explained by reference to the following Examples although the present invention is not intended to be construed as being limited to these examples.

The effects of the present invention were demonstrated with the following A Sheet, B Sheet, and C Sheet. All parts, percents, ratios and the like are by weight unless otherwise indicated.

Preparation of A Sheet

In 400 parts of water at 40°C, 10 parts of pig skin acid treated gelatin and 10 parts of gum arabic were dissolved, and 0.2 parts of Turkey red oil was added as an emulsifier. In the resulting solution, 40 parts of a color former oil was dispersed and emulsified. The color former oil was produced by dissolving 2% Crystal Violet lactone in an oil comprising 4 parts of isopropyl naphthalene and 1 part of kerosene.

When the average size of the droplets became 5 microns, the emulsification was stopped. Water at 40°C was added to make the total weight to 900 parts and stirring was continued. At this time, care was taken not to decrease the liquid temperature below 40°C. Coacervation was caused by adding a 10% acetic acid aqueous solution and by adjusting the pH of the liquid to 4.0 to 4.2. The stirring was further continued and after 20 minutes, the liquid was cooled with ice water to thereby gel the coacervation film deposited on the droplets. When the liquid temperature became 20°C, 7 parts of a 37% formaldehyde aqueous solution was added. At 10°C, 40 parts of a 7% aqueous solution of the sodium salt of carboxymethyl cellulose was added, and then a 15% aqueous solution of sodium hydroxide was added to thereby adjust the pH to 9. At this time, the addition of sodium hydroxide was carried out with the greatest care. The liquid was heated for 20 minutes while stirring to thereby increase the liquid temperature to 50°C.

The thus obtained microcapsule liquid was adjusted to 30°C and then the liquid was coated on a paper of 40 g/m$^2$ in an amount (solid content) of 6 g/m$^2$ and dried.

Preparation of B sheet

To 150 parts of water was added 6 parts of a 20% sodium hydroxide aqueous solution. With stirring, 50 parts of activated clay was gradually added. After stirring for 30 minutes, 20 parts of a styrene-butadiene latex (concentration: 48% by weight; pH: 8.5; viscosity: 250 c.p.; average particle size: 0.16 $\mu$) was added and the composition was mixed uniformly. The resulting coating liquid was coated on a paper on 40 g/m$^2$ in an amount of 8 g/m$^2$ (solid content), which was, after drying, subjected to calendering. Then, on the opposite side of the support, the same capsule coating liquid as used in preparing A Sheet was coated in an amount of 6 g/m$^2$ (solid content) and dried.

Preparation of C Sheet

The same developer (activated clay) coating liquid as used in preparing B Sheet was coated on a paper of 110 g/m$^2$ in an amount of 8 g/m$^2$ (solid content) and after drying, subjected to calendering.

Test Procedure 50 sets of A, B, and C Sheets in the order of A-B-B-C were stacked and cut to a size of 3 cm × 5 cm. To the cut edge of the stack, an adhesive was coated in an amount of 5 g/100 cm$^2$ and dried at room temperature (about 20° ~ 30°C). One hour after the drying, the adhesiveness and the separability were measured using the following methods.

Measurement of Adhesiveness

The adhesion strength (in g) was measured using a tensile strength tester (trade name: Strograph M type, produced by Toyo Seiki Seisakujo). The measuring conditions were as follows:

Load Capacity         1 kg
Tension Speed         150 mm/minute
Load Detector         U gauge type load convertor
Recorder              Feed speed 200 mm/minute

Measurement of Separability

| | |
|---|---|
| No adhesion between C and A Sheets | 100 |
| Slightly adhered, but easily peeled apart | 80 |
| Adhered and peeled apart with difficulty | 60 |
| Completely adhered and not peeled apart at all (separation is impossible) | 0 |

EXAMPLE 1

The sodium salt of the naphthalene sulfonic acid-formaldehyde condensation product represented by the formula:

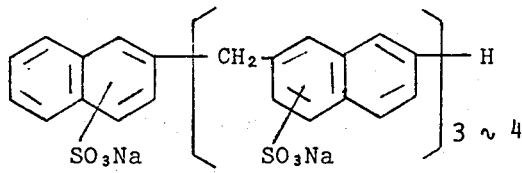

was dissolved in hot water at 50°C in the concentrations as indicated in Table 1, and furthermore polyvinyl alcohol (degree of polymerization: 500; degree of saponification: 88%) as the water-soluble polymer material and sodium sulfate as the water-soluble metal salt were added in the concentrations as indicated in Table 1 to prepared four kinds of adhesive compositions. The adhesive strength and separability between A-B, B-C, and B-C were measured. The results obtained are shown in Table 1.

TABLE 1

| | Adhesive Composition | | | |
|---|---|---|---|---|
| | 1 | 2 | 3 | 4 |
| Concentration of Condensation Product (%) | 10 | 10 | 10 | 10 |
| Concentration of Polyvinyl Alcohol (%) | 5 | 2 | 0.5 | 0.1 |
| Concentration of Sodium Sulfate (%) | 0.5 | 1 | 2 | 4 |
| Adhesion Strength (g) | | | | |
| A-B | 600 | 580 | 520 | 470 |
| B-B | 320 | 410 | 440 | 390 |
| B-C | 260 | 280 | 350 | 320 |
| Separability | 100 | 100 | 100 | 100 |

With the adhesive compositions containing the naphthalene sulfonic acid-formaldehyde condensation product alone, a mixture of the naphthalene sulfonic acid-formaldehyde condensation product and the water-soluble polymer material, and a mixture of the naphthalene sulfonic acid-formaldehyde condensation product, the same test was conducted. The results on adhesive strength and separability are shown in Table 2.

TABLE 2

| | Adhesive Composition | | | | | |
|---|---|---|---|---|---|---|
| | 5 | 6 | 7 | 8 | 9 | 10 |
| Condensation Product (%) | 8 | 20 | 10 | 10 | 10 | 10 |
| Polyvinyl Alcohol (%) | 0 | 0 | 5 | 0.1 | 0 | 0 |
| Sodium Sulfate (%) | 0 | 0 | 0 | 0 | 4 | 0.5 |
| Adhesion Strength (g) | | | | | | |
| A-B | 2 | 21 | 240 | 120 | 70 | 65 |
| B-B | 3 | 22 | 180 | 70 | 120 | 100 |
| B-C | 2 | 19 | 80 | 60 | 150 | 120 |
| Separability | 100 | 100 | 90 | 100 | 100 | 100 |

As apparent from the results in Tables 1 and 2, with the naphthalene sulfonic acid-formaldehyde condensation product alone, the separability was good, but the adhesion strength was low; with a mixture of the naphthalene sulfonic acid-formaldehyde condensation product and the water-soluble polymer material, the adhesion strength was increased, but not sufficiently; and with a mixture of the naphthalene sulfonic acid-formaldehyde condensation product and the water-soluble metal salt, the adhesion strength can be increased without deteriorating the separability, but not sufficiently. To the contrary, with the adhesive of the present invention, the separability was good and the adhesion strength was quite high. The degree of the improvement apparently indicates a synergistic effect between each of the components.

EXAMPLE 2

After 10 parts of the potassium salt of the naphthalene sulfonic acid-formaldehyde condensation product represented by the formula:

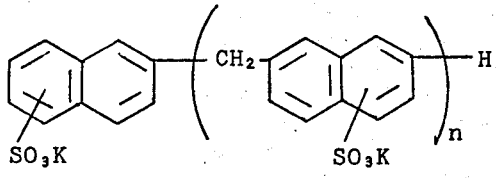

| n | proportion |
|---|---|
| 3 or less | 25% |
| 4 to 6 | 40% |
| 6 to 12 | 35% | was dissolved in 80 parts of hot water at 50°C, 5 parts of a modified styrene-butadiene copolymer latex (solid content: 49% by weight; pH: 6.8; viscosity: 95 c.p. at 25°C; particle size: 0.1 to 15 $\mu$), 0.5 parts of polyvinyl alcohol (average degree of polymerization: 1700; degree of saponification: 88%) as the water-soluble polymer material, and 2 parts of sodium sulfate were added to prepare an adhesive composition.

EXAMPLE 3

In 85 parts of hot water at 60°C, 15 parts of naphthalene sulfonic acid-formaldehyde condensation product sodium salt, 2 parts of carboxymethyl cellulose sodium salt, and 0.5 part of zinc chloride were dissolved to prepare an adhesive composition.

EXAMPLE 4

In 75 parts of hot water at 50°C, 20 parts of the sodium salt of the methylnaphthalene sulfonic acid-formaldehyde condensation product represented by the formula:

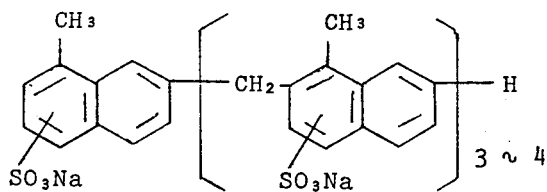

3 parts of shellac, 0.5 parts of mono-ethanolamine, and 1 part of aluminum sulfate were dissolved to prepare an adhesive composition.

The properties of the adhesive compositions as obtained in Examples 2 to 4 are shown in Table 3.

TABLE 3

| Example | Adhesion Strength (g) | | | Separability |
|---|---|---|---|---|
| | A-B | B-B | B-C | |
| 2 | 750 | 530 | 480 | 100 |
| 3 | 430 | 320 | 280 | 100 |
| 4 | 350 | 290 | 260 | 100 |

From the results in Tables 1, 2, and 3, it can be seen that the adhesive composition of the present invention containing the naphthalene sulfonic acid-formaldehyde condensation product, the water-soluble polymer material, and the water-soluble metal salt is quite effective for separating a number of sheets into groups.

While the invention has been described in detail and with reference to specific embodiments thereof, it will be apparent to one skilled in the art that various changes and modifications can be made therein without departing from the spirit and scope thereof.

What is claimed is:

1. A process for separating a number of pressure sensitive copying papers into groups which comprises (1) coating an adhesive composition comprising a naphthalene sulfonic acid-formaldehyde condensation product, a water-soluble polymer material, and a water-soluble metal salt, on an edge of a stack assembly of said copying papers and then (2) fanning said copying papers; said naphthalene sulfonic acid-formaldehyde condensation product comprising about 5 to 40% by weight of the adhesive composition, said water-soluble polymer, which is selected from the group consisting of a natural polymer, a semi-systhetic polymer and a synthetic polymer, comprising about 0.1 to 20% by weight of the adhesive composition, and said water-soluble metal salt, which consists of a salt of a metal selected from the group consisting of a univalent metal, a divalent metal and a trivalent metal, comprising about 0.1 to 6% by weight of the adhesive composition.

2. The process according to claim 1, wherein the naphthalene sulfonic acid-formaldehyde condensation product is represented by the formula:

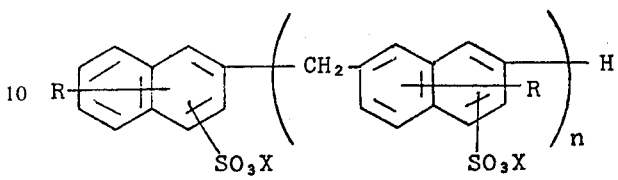

wherein R, which may be the same or different and a plurality of which may be present on the naphthalene nuclei, is a hydrogen atom or an alkyl group; X is a hydrogen atom, an alkali metal atom, or an ammonium group; and n is an integer.

3. The process according to claim 2, wherein R is an alkyl group containing 1 to 4 carbon atoms.

4. The process according to claim 2, wherein X is a sodium atom.

5. The process according to claim 2, wherein X is a potassium atom.

6. The process according to claim 2, wherein n is an integer of from 1 to 5.

7. The process according to claim 1, wherein the natural polymer is selected from the group consisting of gelatin, caein, albumin, agar agar, shellac, starch, dextrin, an alginic acid salt, gum arabic, pectin, tragacanth gum, and gluten.

8. The process according to claim 1, wherein the semi-synthetic polymer is selected from the group consisting of carboxymethyl cellulose, phosphoric acid starch, maleated starch, cyanoethyl carboxymethyl starch, hydroxyethyl starch, dialdehyde starch, and oxidized starch.

9. The process according to claim 1, wherein the synthetic polymer is selected from the group consisting of polyvinyl alcohol, polyacrylamide, polyvinyl pyrrolidone, polyethylene oxide, polyvinyl methyl ether, an acrylic acid-acrylamide copolymer, a styrene-methacrylic acid copolymer, a vinyl acetate-acrylic acid copolymer, a diemthyl itaconate-acrylic acid copolymer, an acrylonitrile-acrylic acid copolymer, and an acrylamide-styrene-acrylic acid copolymer.

10. The process according to claim 1, wherein the water-soluble metal salt is selected from the group consisting of $K_2SO_4$, $Na_2SO_4$, $ZnCl_2$, and $ZnSO_4$.

11. The process according to claim 1, wherein said adhesive composition includes a surface active agent in a proportion of about 0.1 to 5% by weight based upon the weight of the naphthalene sulfonic acid-formaldehyde condensation product.

* * * * *